3,318,989
METHOD FOR MELT-SPINNING OF
FILAMENTARY ARTICLES
Toru Sato, Shigeo Katsuyama, and Toshio Sasaki, Nobeoka-shi, Japan, assignors to Asahi Kasei Kogyo Kabushiki Kaisha, Osaka, Japan, a corporation of Japan
No Drawing. Filed June 23, 1965, Ser. No. 466,429
Claims priority, application Japan, July 3, 1964,
39/37,554; July 4, 1964, 39/37,266
6 Claims. (Cl. 264—176)

This invention relates to a method for producing filamentary articles from heat-meltable polymers having fiber forming ability. In one aspect, this invention relates to a method for producing filamentary articles having superior transparency from polyamide.

The filamentary articles dealt with in the present invention include monofilaments, multifilaments, films, ribbons, strands, and the like. Also, heat meltable polymers cover polyamide, polyvinyl chloride, polypropylene, polyethylene, polyester, and the like.

Filamentary articles of heat-meltable polymers are generally produced by extruding from spinnerets melted polymers to form into filamentary shape and cooling and solidifying extrudates by a cooling medium. As such a cooling medium, various materials i.e., various kinds of liquid including mercury and various kinds of gaseous substances have been heretofore used. Among liquid mediums, water has been most popularly used as an inert medium. However, when substances such as polyamide and the like in heated or melted state contact with water, they are affected by water, advancing in crystallinity and falling in transparency and lustre. This renders not only the stretching at room temperature difficult but also the surface structure of filamentary articles rough at stretching time. When non-polar solvents are used, they are liable to adhere to or be adsorbed by the filamentary articles due to the difficulty of removal in the subsequent process. The use of mercury as a cooling medium is a health hazard for the workers. When a gaseous substance is used as a cooling medium, the cooling velocity is slow. Hence substances such as polyamide and the like are liable to be crystallized by the end of cooling, losing transparency and stretchability at room temperature. When filamentary articles of higher denier are to be cooled, an attempt to receive them on a drum or belt to effect cooling by contact with cold surfaces or cold gas has been proposed but this is not acceptable because of the slow cooling velocity. In such instances, substances such as polyamide or the like are not only subject to be crystallized, to deteriorate in transparency and lose stretchability at room temperature but in addition such drawbacks are presented as the difficulty of increasing their spinning velocity and the liability of forming products of non-uniform cross-section which are caused by laying the articles directly on the drum or belt.

The above-mentioned drawbacks are completely overcome in accordance with the method of the present invention which comprises contacting heated or melted filamentary extrudate with, as a novel cooling medium, $Na_2SO_4 \cdot 10H_2O$ or a substance having a fairly similar effect, such as $Na_2CO_3 \cdot 10H_2O$, or $Na_2CO_3 \cdot 7H_2O$ or $Na_2S_2O_3 \cdot 5H_2O$ to cool and solidify the said extrudate.

In accordance with the present method, heated or melted filamentary substances of heat-meltable polymers having fiber forming ability and having been extruded from spinnerets are hung down upon fine particles of the above-mentioned compound which are laid on a revolving belt and always maintained in the band-like form of uniform thickness and thereafter are allowed to travel with the belt while maintaining the contact with the fine particles so as to be cooled and solidified. In an alternative method, the above-mentioned heated or melted filamentary substances are passed through a layer of fine particles of the above-mentioned compound to be cooled and solidified by the contact. In another alternative method, the above-mentioned heated or melted filamentary substances are passed through a slurry prepared by incorporating a certain amount of aqueous solution of the above-mentioned compounds into the respective compounds and cooling and solidifying are effected by the contact therewith.

After either of these methods, cooled filamentary articles are washed with water and wound up on bobbins or the like or they may be subjected to various other treatments.

The reason why heated or melted filamentary substances are cooled efficiently by the contact with the above-mentioned compound or its slurry lies in that it loses a part or all of its crystallization water and absorbs a large amount of heat at temperatures higher than a definite point. For example $Na_2SO_4 \cdot 10H_2O$ liberates its crystallization water at a temperature of 32.4° C. to absorb heat of 19.02 KCal and $Na_2CO_3 \cdot 10H_2O$ liberates 3 mols of its crystallization water at a temperature of 32.1° C. to become $Na_2CO_3 \cdot 7H_2O$, which liberates 6 mols of its crystallization water at a temperature of 35.3° C. to absorb heat of 18.42 KCal in total. The utilization of above-mentioned endothermic effects in the present process afford a quick cooling effect of higher cooling capacity compared with common cooling medium.

There are many compounds which liberate the crystallization water e.g. $CaCl_2 \cdot 6H_2O$, $MgCl_2 \cdot 6H_2O$

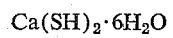

$Ca(SH)_2 \cdot 6H_2O$ $Zn(ClO_3)_2 \cdot 4H_2O$, $CdBr_2 \cdot 4H_2O$ and the like, however, they have little commercial value as a cooling medium to be used for cooling and solidifying heated or melted filamentary extrudates in the melt spinning process for the following reasons, (1) the temperatures at which they liberate crystallization water are too high to solidify said melted filamentary substances or the heat absorbed at the liberation is small, (2) the temperature at the liberation of crystallization water is exceedingly low or efflorescence inclination are strong, (3) diliquescence inclinations are strong, (4) the contact with heated or melted substances cause not only the liberation of crystallization water but also chemical decomposition, (5) cohesive inclinations are strong and fluidity is low and agitation is difficult at the state coexisting with aqueous solution, (6) they discolor filamentary articles, (7) their costs are high and the recovery of high efficiency are required or (8) they cause extreme swelling or act to decompose filamentary articles.

The above-mentioned compounds freed from the crystallization water flow down while forming an aqueous solution or slurry with liberated water in which for the greater part they are dissolved or adhere to adjacent above-mentioned compound or to filamentary articles.

The separation of water naturally occurs from the contact part and separated water works efficiently to attain the object of cooling and solidifying while preventing the filamentary articles from deforming and being marred by virtue of its function as a lubricant. The remaining aqueous solution or aqueous solution adhering to adjacent above-mentioned compound makes the compound move readily and contact smoothly with heated or melted filamentary articles.

Since the heated or melted filamentary articles of heat-meltable polymer is quickly cooled and solidified, substances such as polyamide are less crystallized, and become easily stretchable at room temperature and superior in transparency.

Further it is a characteristic point of the present method hat the influence of water is less since its cooling mechanism is entirely different from that of immersion-in-water method. Furthermore since the cooling principle in the present invention does not merely rely on the common conduction brought about by the contact with liquid or gas but also most positively rely on the strong endothermic effect at the time of liberating crystallization water and since the amount of heat absorbed is large per unit weight of coolant, the cooling velocity is high and the length of cooling apparatus is not required to be large. Besides, there is no need of great care in controlling the temperature of a cooling bath. So long as the cooling is carried out at temperatures lower than that at which a large amount of compound containing crystallization water is existing, a slight variation of temperature hardly causes trouble. This is also an important advantage.

The above-mentioned compounds or their aqueous solution adhering to filamentary articles can be readily eliminated by washing with water.

Polymers capable of forming fibers to which the present method can be effectively applied include various kinds of polyamides, polyvinyl chloride, polypropylene, polyethylene, polyester and the like.

The present invention may be more fully understood from the following examples which are offered by way of illustration and not by way of limitation.

*Example 1*

Polyamide (nylon 6) having been melted by heating at a temperature of 275° C. was extruded through a spinneret provided with 10 spinning orifices each having a diameter of 1.6 mm. and hung down and passed through a piled layer of $Na_2SO_4 \cdot 10H_2O$ having a particle diameter of smaller than 0.3 mm. When the extruded filaments reached the depth of 40 cm., their travelling direction was changed by a rod and they were further passed through a piled layer of $Na_2SO_4 \cdot 10H_2O$ over a length of 40 cm. and taken up at a velocity of 32 m./min. After being washed with water they were stretched 4.2 times as long as the original length at room temperature. Each of the resulting filamentary articles had a round cross-section of about 970 denier, a tenacity of 4.1 g./d. and an elongation of 37 percent. They were superior in transparency and lustre compared with those cooled and solidified with water at a temperature of 20° C. and at the same other conditions.

*Example 2*

Polyvinyl chloride having been melted by heating at temperature of 200° C. were extruded through a spinneret provided with 10 spinning orifices each having a diameter of 1.6 mm. and hung down upon a belt having a horizontal length of 200 cm., running at a velocity of 32 m./min. and on the surface of which $Na_2CO_3 \cdot 10H_2O$ having a particle size smaller than 0.4 mm. was laid with uniform thickness of about 2 cm. At a point 20 cm. apart from the suspension point, $Na_2CO_3 \cdot 10H_2O$ powder was overlaid upon the travelling filaments so as to form a layer of about 1 cm. to cover a latter and at the point 80 cm. from the suspension point, the travelling filaments were separated from the belt. After being washed with water, the filaments were stretched 3.8 times as long as the original length. Each of the resulting filaments had a round cross-section of about 1200 denier, a tenacity of 2.2 g./d. and an elongation of 24 percent.

*Example 3*

Polyamide (nylon 6) having been melted by heating at temperature of 290° C. was extruded through a spinneret provided with 6 spinning orifices each having a diameter of 2.2 mm. and hung down and passed through a slurry at a temperature of 22° C. prepared by mixing 5 parts by weight of $Na_2SO_4 \cdot 10H_2O$ and one part by weight of water. When the extruded filaments reached the depth of 30 cm., their travelling direction was changed by use of a direction change roll. They were further passed through the slurry over a length of 40 cm. and taken up at a velocity of 33 m./min. Thereafter they were washed with water and stretched 4.2 times as long as the original length. Each of the resulting filaments had a round cross-section of about 2000 denier, a tenacity of 4.3 g./d. and an elongation of 29.0 percent. Compared with filaments cooled and solidified with water at a temperature of 22° C. at the same other conditions, they had more superior transparency and lustre.

*Example 4*

Polypropylene having been melted by heating at a temperature of 265° C. was extruded through a spinneret provided with 20 spinning orifices each having a diameter of 1.2 mm. and hung down and passed through a slurry at a temperature of 15° C. prepared by mixing and stirring 10 parts by weight of $Na_2S_2O_3 \cdot 5H_2O$ and one part by weight of water. When the extruded filaments reached the depth of 30 cm., they were turned to travel in a different direction by a roll, passed through the slurry for a distance of 40 cm. and taken up at a velocity of 30 m./min. After being washed with water, they were stretched 6.3 times as long as the original length at a temperature of 50° C. Each of the resulting filaments had a round cross-section of about 330 denier, a tenacity of 4.5 g./d. and an elongation of 17.0 percent.

*Example 5*

Polyethylene terephthalate having been melted by heating at a temperature of 300° C. was extruded through a spinneret provided with 20 spinning orifices each having a diameter of 1.2 mm. and hung down to pass through a slurry at a temperature of 30° C. prepared by mixing and stirring 16 parts by weight of $Na_2SO_4 \cdot 10H_2O$ and one part by weight of water. When they reached the depth of 30 cm., they were turned to travel in a different direction by a roll. They were further passed through the slurry for a distance of 40 cm. and taken up at a velocity of 30 m./min. After being washed with water, they were stretched 3 times as long as the original length at a temperature of 70° C. and then 4.5 times the original length at a temperature of 150° C. Each of the resulting filaments had a round cross-section of about 550 denier, a tenacity of 3.9 g./d. and an elongation of 18.0 percent.

*Example 6*

High density polyethylene having been melted by heating at a temperature of 245° C. was extruded through a spinneret provided with 36 spinning orifices each having a diameter of 0.8 mm. and hung down to pass through a slurry at a temperature of 45° C. in temperature prepared by mixing and stirring 17 parts by weight of

$$Na_2S_2O_3 \cdot 5H_2O$$

and one part by weight of water. When the extruded filaments reached the depth of 30 cm., they were turned to travel in a different direction by a roll, passed through the slurry for a distance of 40 cm. and taken up at a velocity of 25 m./min. After being washed with water, they were stretched 8.0 times as long as the original length at a temperature of 97° C. Each of the resulting filaments had a round cross-section of about 100 denier, a tenacity of 4.6 g./d. and an elongation of 40 percent.

*Example 7*

Polyamide (nylon 6) having been melted by heating at a temperature of 275° C. was extruded through a spinneret provided with 8 spinning orifices each having a diameter of 1.8 mm. and hung down to pass through a slurry at a temperature of 22° C. prepared by mixing and stirring 12 parts by weight of $Na_2S_2O_3 \cdot 5H_2O$ and one part by weight of water. When the extruded filaments reached the depth of 30 cm., they were turned in a different direction by means of a roll and further passed through the slurry at a temperature of 40 cm. and taken up at a velocity of 35 m./min. After being washed with water, they were stretched 4.2 times as long as the original length. Each of the resulting filaments had a round cross-section of about 1500 denier, a tenacity of 4.1 g./d and an elongation of 32.0 percent. They were superior in transparency and lustre compared with those cooled and solidified with water at a temperature of 22° C. and at the same other conditions.

What is claimed is:

1. A method for producing filamentary articles of a polymer capable of forming fibers by melt extrusion which comprises contacting molten or hot filamentary extrudate of said polymers from spinnerets with a hydrate of an inorganic salt selected from the group of $Na_2SO_4 \cdot 10H_2O$, $Na_2CO_3 \cdot 10H_2O$, $Na_2CO_3 \cdot 7H_2O$ and $Na_2S_2O_3 \cdot 5H_2O$, the filamentary extrudate being at a sufficiently elevated temperature to cause the salt to liberate at least a part of the water of crystallization to accentuate heat absorption whereby to obtain cooled and solidified filamentary articles.

2. A method for producing filamentary articles of polyamide which comprises contacting molten or hot filamentary extrudate of polyamide from spinnerets with $Na_2SO_4 \cdot 10H_2O$, the filamentary extrudate being at a sufficiently elevated temperature to cause the salt to liberate at least a part of the water of crystallization to accentuate heat absorption whereby to obtain cooled, and solidified filamentary articles of polyamide having superior transparency.

3. A method for producing filamentary articles of polyamide which comprises contacting molten or hot filamentary extrudate of polyamide from spinnerets with a hydrate of an inorganic salt selected from the group consisting of $Na_2CO_3 \cdot 10H_2O$, $Na_2CO_3 \cdot 7H_2O$ and $$Na_2S_2O_3 \cdot 5H_2O$$

the filamentary extrudate being at a sufficiently elevated temperature to cause the salt to liberate at least a part of the water of crystallization to accentuate heat absorption whereby to obtain cooled and solidified polyamide having superior transparency.

4. A method for producing filamentary articles of polymers capable of forming fiber selected from the group of polyvinyl chloride, polypropylene, polyethylene and polyethylene terephthalate which comprises contacting molten or hot filamentary extrudate of the above mentioned polymer from spinnerets with $Na_2SO_4 \cdot 10H_2O$, the filamentary extrudate being at a sufficiently elevated temperature to cause the salt to liberate at least a part of the water of crystallization to accentuate heat absorption whereby to obtain cooled and solidified filamentary articles of said polymers.

5. A method for producing filamentary articles of polymers capable of forming fiber selected from the group of polyvinyl chloride, polypropylene, polyethylene and polyethylene terephthalate which comprises contacting molten or hot filamentary extrudate of the above-mentioned polymer from spinnerets with a hydrate of an inorganic salt selected from the group of $Na_2CO_3 \cdot 10H_2O$, $Na_2CO_3 \cdot 7H_2O$ and $Na_2S_2O_3 \cdot 5H_2O$, the filamentary extrudate being at a sufficiently elevated temperature to cause the salt to liberate at least a part of the water of crystallization to accentuate heat absorption whereby to obtain cooled and solidified filamentary articles of said polymers.

6. A method as claimed in claim 1 wherein said obtained filamentary articles are washed with water to remove any adherent salt.

References Cited by the Examiner

UNITED STATES PATENTS

| | | | |
|---|---|---|---|
| 2,034,008 | 3/1936 | Taylor | 264—131 X |
| 3,027,602 | 4/1962 | Hamilton et al. | 264—178 |
| 3,052,989 | 9/1962 | Doleman. | |
| 3,061,941 | 11/1962 | Goy et al. | |
| 3,072,968 | 1/1963 | Watson et al. | |
| 3,104,937 | 9/1963 | Wyckoff et al. | 264—178 |
| 3,242,528 | 3/1966 | Elder. | |
| 3,264,389 | 8/1966 | Sims | 264—176 X |

ALEXANDER H. BRODMERKEL, Primary Examiner.

J. H. WOO, Assistant Examiners.